United States Patent
Choi et al.

(10) Patent No.: US 6,754,473 B1
(45) Date of Patent: Jun. 22, 2004

(54) APPARATUS AND METHOD FOR PROVIDING CLOSED-LOOP TRANSMIT ANTENNA DIVERSITY IN A MOBILE COMMUNICATION SYSTEM

(75) Inventors: Jin-Ho Choi, Songnam-shi (KR);
Sung-Oh Hwang, Yongin-shi (KR);
Hyun-Woo Lee, Suwon-shi (KR);
Chang-Soo Park, Seoul (KR); Ho-Kyu Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 644 days.

(21) Appl. No.: 09/685,749

(22) Filed: Oct. 10, 2000

(30) Foreign Application Priority Data

Oct. 9, 1999 (KR) ................................ 10-1999-0043679

(51) Int. Cl.[7] ................................................ H04B 1/02
(52) U.S. Cl. ........................ 455/101; 455/67.11; 455/69
(58) Field of Search ........................ 455/101, 69, 67.11, 455/67.16, 562.1, 67.14, 68, 276.1

(56) References Cited

U.S. PATENT DOCUMENTS

| | | | | |
|---|---|---|---|---|
| 6,141,542 A | * | 10/2000 | Kotzin et al. | 455/101 |
| 6,192,256 B1 | * | 2/2001 | Whinnett | 455/562.1 |
| 6,594,473 B1 | * | 7/2003 | Dabak et al. | 455/101 |
| 6,636,495 B1 | * | 10/2003 | Tangemann | 370/334 |

* cited by examiner

*Primary Examiner*—Quochien B. Vuong
*Assistant Examiner*—Blane J. Jackson
(74) *Attorney, Agent, or Firm*—Dilworth & Barrese LLP

(57) ABSTRACT

An apparatus and method for providing closed-loop transmit antenna diversity in a mobile communication system is provided. To maximize the sum of the vectors of signals received from at least two antennas at a base station, a mobile terminal calculates the vectors of the signals received from the antennas of the base station, calculates differential vectors for the input signal vectors in order to maximize the sum of the input signal vectors, and transmits information about the calculated differential vectors to the base station, which uses them to maximize the sum of the vectors of signals subsequently received by the mobile terminal.

28 Claims, 11 Drawing Sheets

APPARATUS AND METHOD FOR PROVIDING CLOSED-LOOP TRANSMIT ANTENNA DIVERSITY IN A MOBILE COMMUNICATION SYSTEM

PRIORITY

This application claims priority to an application entitled "Apparatus and Method for Providing Closed-Loop Transmit Antenna Diversity in Mobile Communication System" filed in the Korean Industrial Property Office on Oct. 9, 1999 and assigned Serial No. 99-43679, the contents of which are hereby incorporated by reference.

BACKGROUND OF THE INVENTION

1. Field of the Invention

The present invention relates generally to an apparatus and method for providing transmission antenna diversity on a downlink, and in particular, to an apparatus and method for providing closed-loop transmission antenna diversity by adaptively applying weights to closed-loop transmission diversity according to the channel environment in a mobile communication system.

2. Description of the Related Art

CDMA (Code Division Multiple Access) systems have evolved from the conventional voice transmission-based mobile communication systems to the new IMT-2000 standard, which provides such additional services as transmission of high quality voice, moving pictures, and Internet browsing.

For provision of these various services, the capacity of the downlink must have a higher gain for the increased traffic. For a mobile terminal that is moving at a low speed, it is known that a base station using antenna diversity can have gain about 1 to 7 dB higher than a base station which is not using antenna diversity in a CDMA mobile communication system. This implies that system capacity can be increased by two or three times and that a receiver of the terminal has a high enough gain.

The transmit antenna diversity is a scheme of transmitting a signal to a terminal through at least two transmission antennas from a base station. Two approaches may be taken when using transmission antenna diversity.

One of the approaches is a closed-loop scheme (feedback type transmission diversity). The mobile terminal estimates the strengths of signals received from the base station antennas and transmits weight information for each antenna to the base station. After changing weights for transmission power and phase based on the weight information, the base station transmits data.

The other approach is an open-loop scheme. The base station allocates equal transmission power to each antenna and transmits data through the antennas with different orthogonal codes.

The following description concerns the closed-loop transmit antenna diversity scheme.

A base station as described hereinbelow belongs to an UMTS (Universal Mobile Telecommunication System). While the base station may have more than two transmission antennas, two transmission antennas are assumed in the following description for greater clarity.

If the base station transmits signals through a plurality of antennas, i.e., with transmit antenna diversity, the reception BER (Bit Error Rate) is decreased at the terminal. For downlink transmission through the antennas, the base station allocates a unique weight to each antenna transmission signal. The antenna-specific weight should be set in such a way that the terminal can receive the next antenna signal with maximal power. If the terminal estimates the downlink channel environment and notifies the base station of the estimation, the base station can allocate an optimum weight to each antenna. To this end, the mobile terminal estimates the status of a channel on which a signal is received from the base station and transmits the estimated channel status (i.e., channel environment) to the base station.

FIG. 1 is a block diagram of a transmitting device with transmit antenna diversity in a general mobile communication system.

Referring to FIG. 1, reference numerals 101 and 111 denote a primary common pilot channel (P_CPICH) and a secondary common pilot channel (S_CPICH), respectively. The base station uses one P_CPICH 101. It can also generate a plurality of S_CPICHs 111 to transmit on the downlink with feedback-mode transmit diversity. The P_CPICH 101 and S_CPICHs 111 are all 1 s and spread with one of orthogonal variable spreading factor (OVSF) code with Spreading Factor (SF) 256. The P_CPICH 101 is scrambled with a primary scrambling code and the S_CPICH 111 is scrambled with a secondary scrambling code. Both the common pilot channels 101 and 111 are transmitted at 300 bits per 10-ms frame.

A spreader 103 spreads the P_CPICH 101 and a spreader 113 spreads the S_CPICH 111. A multiplier 104 scrambles the spread P_CPICH 101 with a primary scrambling code. One primary scrambling code is assigned to each base station, in order to identify the base station. A multiplier 114 scrambles the spread S_CPICH 111 with the secondary scrambling code. An encoder 133 subjects a downlink dedicated physical data channel (DPDCH) 131 to encoding and rate matching. An interleaver 135 interleaves the downlink DPDCH received from the encoder 133. A multiplexer (MUX) 137 multiplexes a TPC (transmit power control) 136, a TFCI (Transmit Format Combination Indicator) 138, and the interleaved DPDCH. The TPC 136 is used to control signal transmission power and the TFCI 138 provides information about the channel encoding method and transmission rate of the data. A MUX 141 multiplexes the multiplexed DPDCH, TFCI, and TPC received from the MUX 137 and a pilot signal 132 for antenna #1 as indicated by reference numeral 180. A MUX 151 multiplexes the multiplexed DPDCH, TFCI, and TPC received from the MUX 137 and a diversity pilot signal 134 for antenna #2 as indicated by reference numeral 181. The pilot signals 131 and 134 typically have the same pilot pattern but may have different pilot patterns.

A spreader 143 spreads the output of the MUX 141 with an assigned OVSF code. A multiplier 144 scrambles the output of the spreader 143 with the primary scrambling code or the secondary scrambling code. The secondary scrambling code is used instead of the primary scrambling code when there is lack of OVSF codes assigned to channels using the primary scrambling code. A multiplier 145 multiplies the output of the multiplier 144 with a weight 175 assigned to antenna #1 180. A summation device 160 sums the P_CPICH of antenna #1 180 received from the multiplier 104 and the DPDCH received from he multiplier 145. The sum is filtered by a filter 162, modulated to a radio signal y an RF module 164, and transmitted to the terminal through antenna #1 180.

A spreader 153 spreads the output of the MUX 151. A multiplier 154 scrambles the output of the spreader 153 with the primary scrambling code or the secondary scrambling code. A multiplier 155 multiplies the output of the multiplier 154 with a weight 174 assigned to antenna #2 181. A summation device 161 sums the S_CPICH received from the multiplier 114 and the DPDCH received from the multiplier 155. The sum is filtered by a filter 183, modulated to a radio signal by an RF module 185, and transmitted to the terminal through antenna #2 181.

A weight generator 171 generates weights 174 and 175 for antennas #1 and #2 based on downlink channel status information received from the mobile terminal and feeds them to the multipliers 155 and 145, respectively. The weights 174 and 175 are expressed in complex vectors and one of them has a fixed value.

FIG. 2 is the format of a feedback signal message by which the terminal transmits the downlink channel status information to the base station.

Referring to FIG. 2, the feedback signal message is transmitted on an uplink dedicated physical control channel (UL_DPCCH), at a rate of ten bits per slot. Specifically, the feedback signal message includes a pilot field 201, a TFCI field 202, a FBI (Feedback Indicator) field 203, and a TPC field 204. These fields occupy a total of ten bits. The length of each field in the feedback signal message varies depending on the channel environment.

The channel environment is indicated by presence or absence of the TFCI field 202 and the FBI field 203. According to the channel environment, the pilot field 201 can be five to eight bits. For example, the TFCI field 202 is used when the base station and the terminal transmit channels with different SFs at the same time. In this case, the TFCI field 202 of an uplink dedicated physical channel is two bits. The TPC field 204 is used to control the power of a downlink channel, occupying one or two bits.

The FBI field 203 is used to transmit feedback information about SSDT (Site Selection Diversity Transmission) and feedback type transmission diversity. The SSDT is information indicating which cell is transmitting the highest power signal to the mobile terminal during soft handoff. The FBI field 203 is one or two bits. In the case of a one-bit FBI, this implies that one of the SSDT and the feedback transmit diversity is used. In the case of a two-bit FBI, this implies that both the SSDT and the feedback transmit diversity are used. The FBI field 203 includes an S field for the SSDT and a D field for the feedback transmit diversity. One bit is assigned to each of the S and D fields. If the SSDT is not used, the D field for the feedback transmit diversity can be two bits (the S field is used for the feedback transmit diversity).

FIG. 3 illustrates a channel environment information set transmitted to the base station in the D field of the FBI field 203 by the terminal. The channel environment information set is four bits. Of this, only one bit of the channel environment information is transmitted per slot. Therefore, the channel environment information set is transmitted over four slots. In order to transmit the channel environment information set to the base station, the terminal estimates the channel environment between the base station and the terminal from the P_CPICH received through antenna #1 180 and the S_CPICH received through antenna #2 181 of the base station.

The FSM bits shown in FIG. 3 are transmitted bit by bit through the D field for the feedback type transmit diversity in the FBI field of the uplink DPCCH. The length of the channel environment information set is the sum of lengths of the power weight $N_{PO}$ 301 and the phase weight $N_{PH}$ 303.

The $N_{PO}$ 301 is one bit and the $N_{PH}$ 303 is three bits. The $N_{PO}$ 301 precedes the $N_{PH}$ 303 in the order of transmission. Referring to FIG. 3, transmission of the channel environment information set starts with its MSB (Most Significant Bit) and ends with its LSB (Least Significant Bit).

TABLE 1

| $FSM_{PO}$ | power_ant 1 | power_ant 2 |
|---|---|---|
| 0 | 0.2 | 0.8 |
| 1 | 0.8 | 0.2 |

TABLE 2

| $FSM_{PH}$ | phase difference between antennas (degrees) |
|---|---|
| 000 | 180 |
| 001 | −135 |
| 011 | −90 |
| 010 | −45 |
| 110 | 0 |
| 111 | 45 |
| 101 | 90 |
| 100 | 135 |

Table 1 and Table 2 list the binary channel environment information set transmitted in the D field of the FBI field, which is used for weight generation by the transmitting device of the base station shown in FIG. 1. Table 1 shows the MSB of the channel environment information set. In Table 1, $FSM_{PO}=0$ indicates that estimated channel power ratio of the two antennas is approximately 0.2:0.8, $FSM_{PO}=1$ indicates that estimated channel power ratio of the two antennas is approximately 0.8:0.2. Table 2 shows the difference in phase, which is estimated at the mobile station, between a signal transmitted through an antenna selected as a reference antenna and a signal transmitted through another antenna at the base station.

The channel environment information set represents the indexes of values as listed in Table 1 and Table 2, which are the most approximate to a downlink channel environment estimation value obtained from downlink channel signals received in the mobile terminal from antennas #1 and #2 of the base station.

As shown in Table 1 and Table 2, weights to be assigned to the transmission antenna are preliminarily agreed between the terminal and the base station in the conventional technology of feedback-mode closed-loop diversity.

In the following description, let the reference antenna be antenna #1 and the transmission power of a downlink channel signal be normalized to 1.

The terminal receives the P_CPICH and the S_CPICH from antenna #1 and antenna #2 of the base station, respectively, and estimates the phase difference and power of each common pilot channel. If it turns out that the phase difference between the P_CPICH and the S_CPICH is 30° and the power levels of the P_CPICH and the S_CPICH are 0.7 and 0.3, respectively, the terminal determines a power index of 1 ($FSM_{PO}=1$) with 0.8 for the power of the P_CPICH of antenna #1 and 0.2 for the power of the S_CPICH of antenna #2, approximate to the estimation values, referring to Table 1. Then, the terminal determines a phase index 111 of 45° as the phase difference approximate to the estimation value of 30°. The power index and the phase index form a channel environment information set. The mobile station inserts each bit of the channel environment information set, starting from the MSB, into the D field of the FSM (Feedback Signaling Message) field and thus transmits the channel environment information set to the base station over four slots.

FIG. 4 illustrates signals expressed in vectors, where such signals are received in the mobile terminal from a plurality of antennas of the base station, and illustrates weight vectors of the channel environment information set as shown in Table 1 and Table 2, on a coordinate plane. A case is assumed where there are two antennas in the base station and transmit signal power control is implemented for each antenna.

In FIG. 4, a channel environment information set related with phase shown in Table 2, '000' represents a vector 401, '001' represents a vector 402, '011' represents a vector 403, '010' represents a vector 404, '110' represents a vector 405, '111' represents a vector 406, '101' represents a vector 407, and '100' represents a vector 408. The terminal transmits to the base station the index of a phase vector most approximate to the phase difference between the signals received through antennas #1 and #2 as the phase-related channel environment information set to the base station. Vectors 421 to 428 are obtained in case the channel environment information set related with the transmit signal power control of each antenna indicates 0.2 for the signal power of each antenna in Table 1. In this case, the signal power of the antennas is controlled to 0.8 and 0.2.

A vector 411 indicates the transmit signal of antenna #1 received at the terminal through its antenna at time t=T. A vector 416 indicates the transmit signal of antenna #2 received at the terminal through its antenna at time t=T. To render the strengths of signals received at the terminal in relation to vectors 411 and 426 maximal, the difference of the phases between the vectors 411 and 426 should be minimal.

To minimize the difference in phase between the transmit signals of antennas #1 and #2 received at the terminal, the base station and the terminal calculate weight vectors to be assigned to the antennas in the following manner. If the base station designates antenna #1 as a reference antenna, the terminal calculates the phase difference between the vector 411 of the transmit signal of antenna #1 and the vector 426 of the transmit signal of antenna #2 based on the vector 411. Since the phase difference between the vectors 411 and 426 is shown to be 40° in FIG. 4, the terminal transmits the index '111' of a vector with the phase difference 45° approximate to the actual phase difference 40° as a phase-related channel environment information set to the base station.

The channel environment information set is used when the base station sets a weight for each antenna to be used at time t=T+1. The base station maintains a current weight for antenna #1 and assigns a weight decreased in phase by 45° from a current weight for antenna #2. In the above conventional method, the weight of the reference antenna is fixed and that of another antenna is varied.

Let a signal to be transmitted from the base station be s[n]. s[n] is a spread signal that becomes L signal sequences after operated with weight vectors W as many as the antennas of the base station. L is the number of the dedicated antennas used in the base station and the number of the weight vectors W assigned to the antennas is (L×1). Thus an output signal x[n] of a diversity transmission antenna is computed by $$x[n]=Ws[n] \quad (1)$$

If the output signal of an $i^{th}$ antenna among the diversity transmission antennas is $$x_i[n]=W_i s[n] \quad (2)$$

The discrete-time multi-path channel output equation of the $i^{th}$ antenna signal can be given by $$y_i[n]=h_{i,0}[n]x_i[n]+h_{i,1}[n]x_i[n-1]+ \ldots +h_{i,M-1}[n]x_i[n-(M-1)] (i=1,2, \ldots, L) \quad (3)$$

where $y_i[n]$ is a signal received at the terminal from the $i^{th}$ antenna, $h_{i,0}, \ldots, h_{i,M-1}$ are the coefficients of the $i^{th}$ channel, and M represents the number of fingers of the terminal. Therefore, the antenna of the terminal receives a signal expressed as $$y[n]=y_1[n]+y_2[n]+y_3[n]+ \ldots +y_L[n]+n[n] \quad (4)$$

where n[n] is channel noise.

When the auto-correlation function of a spreading sequence with which the signal s[n] is spread is close to an impulse sequence, a despread signal formula is $$r_m[p]=(h_{1,m}W_1+h_{2,m}W_2+ \ldots +h_{L,m}W_L)b[p]+u_m[p] (m=0, 1, 2, \ldots, M-1) \quad (5)$$

where $r_m[p]$ is the output of an $m^{th}$ correlator in a rake receiver with the input signal y[n], b[p] is a data symbol, $u_m[p]$ is noise after despreading, $W_L$ is the weight vector, and M is the number of correlators (fingers) in the rake receiver. Eq. (5) can be expressed in a matrix as $$r[p]=[r_1[p] r_2[p] \ldots r_M[p]]^T \quad (6)$$

$$u[p]=[u_1[p] u_2[p] \ldots u_M[p]]^T \quad (7)$$

From Eq. (6) and Eq. (7), a despread signal at the terminal is defined as $$r[p]=H^w b[p]+u[p] \quad (8)$$

where H is the channel estimation matrix with size M×L (M is the number of correlators in the rake receiver of the terminal and L is the number of antennas in the base station).

The coefficient $H^w$ preceding the data symbol b[p] in Eq. (8) influences the SNR (Signal-to-Noise Ratio) of the input signal r[p] at the terminal. Since $H^w$ is a channel estimation matrix and H is a variable depending on channel environment, the base station cannot control H. However, it is possible for the base station to control a weight vector w based on feedback information received from the terminal. Accordingly, the SNR of the input signal r[p] can be increased by optimizing the weight vector w.

To achieve an optimum weight vector, $$W_k=\arg \max w^H H_k^H H_k w / \|w\|^2 = P_k \quad (9)$$

where $w^H$ and $H_k^H$ are the conjugate transpose matrices of w and H, and $P_k$ is the total transmission power of signals transmitted from all the transmission antennas. In calculating a weight by Eq. (9), since the weight vector w is an L×1 complex matrix, the terminal should transmit 2L real numbers representing the weight vector.

In conclusion, when the differences in power and phase between a P_CPICH and an S_CPICH estimated by a terminal are not shown in Table 1 and Table 2, an error occurs between a weight assigned to each antenna in a base station based on a feedback signaling message received from the terminal and a real weight with which the receive signal power of the terminal is maximized in the conventional closed-loop transmit antenna diversity scheme. As a result, the performance deteriorates.

SUMMARY OF THE INVENTION

It is, therefore, an object of the present invention to provide an apparatus and method for adaptively calculating optimum weight vectors for the current transmission stage using optimum weight vectors used at the previous transmission stage in a predetermined period and assigning a weight to each base station antenna based on the obtained weight vectors.

It is another object of the present invention to provide an apparatus and method for receiving signals from a plurality of base station antennas and calculating optimum weight vectors referring to a look-up table listing differential weight vectors in a terminal, so that the sum in vectors of any signals received from the base station antennas is maximal.

It is a further object of the present invention to provide an apparatus and method for transmitting the indexes of differential weight vectors shown in a look-up table to provide adaptively calculated differential weight vectors as channel status information to a base station by a terminal.

It is still another object of the present invention to provide an apparatus and method for initializing adaptively obtained weight vectors at every predetermined interval and then recalculating optimum weight vectors.

The above objects can be achieved by providing an apparatus and method for providing closed-loop transmit antenna diversity in a mobile communication system. To maximize the sum of the vectors of signals received from a base station having at least two antennas through the at least two antennas, a terminal calculates the vectors of the signals received through the antennas of the base station, calculates differential vectors for the input signal vectors to maximize the sum of the input signal vectors, and transmits information about the differential vectors to the base station to maximize the sum of the vectors of signals received at the next time instant.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

In accordance with the present invention, optimum vectors are searched for at every predetermined interval for a predetermined time period. Specifically, a base station is informed of downlink channel status by a mobile terminal and calculates a weight vector for each of a plurality of antennas. Upon receipt of new downlink channel status information at the next time instant, the base station assigns a weight vector updated according to the new downlink channel status information to each antenna.

Figure 1:
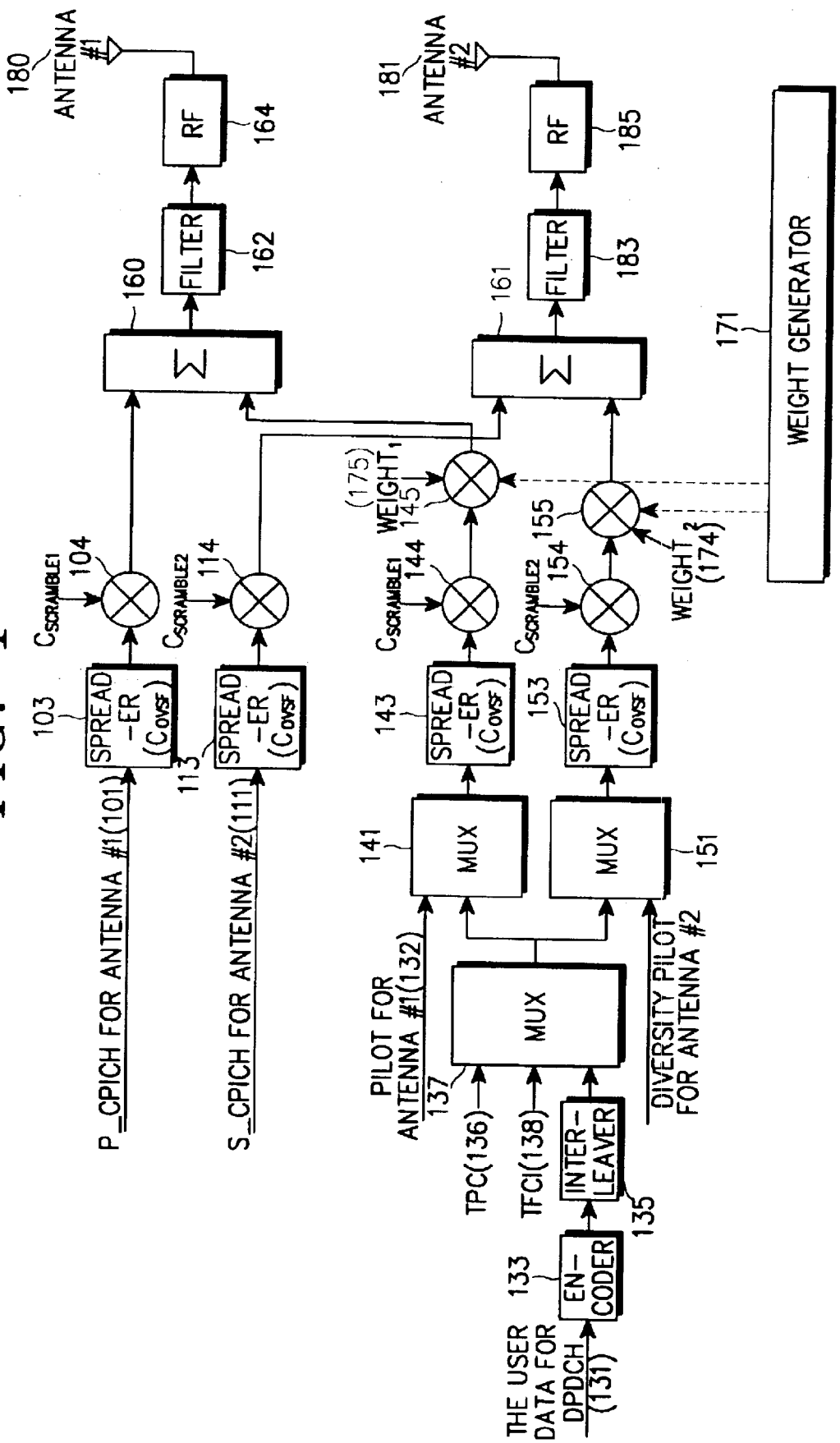
FIG. 1 is a block diagram of a transmitting device with a transmit antenna diversity controlling apparatus in a general mobile communication system.
Figure 2:
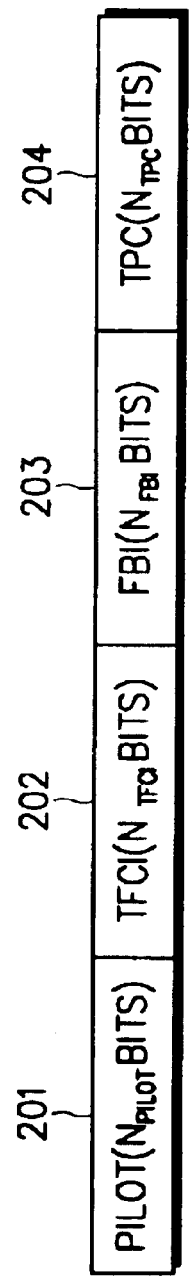
FIG. 2 illustrates the format of an uplink dedicated physical channel frame in the general mobile communication system.
Figure 3:
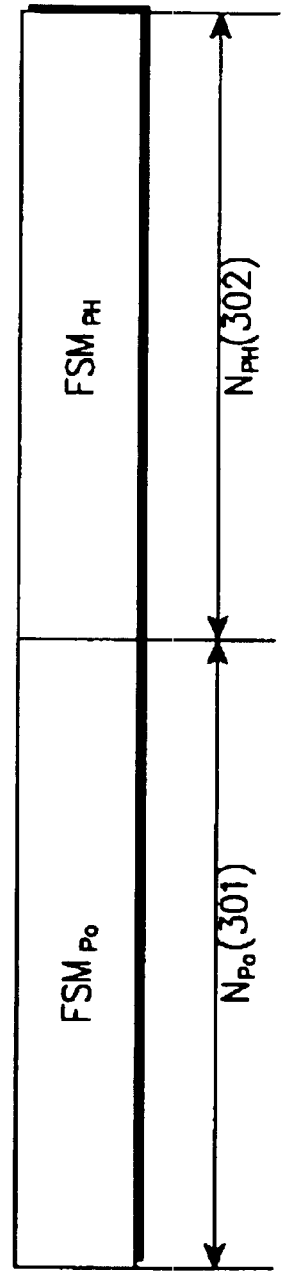
FIG. 3 illustrates the structure of a feedback information field in the dedicated physical channel frame.
Figure 4:
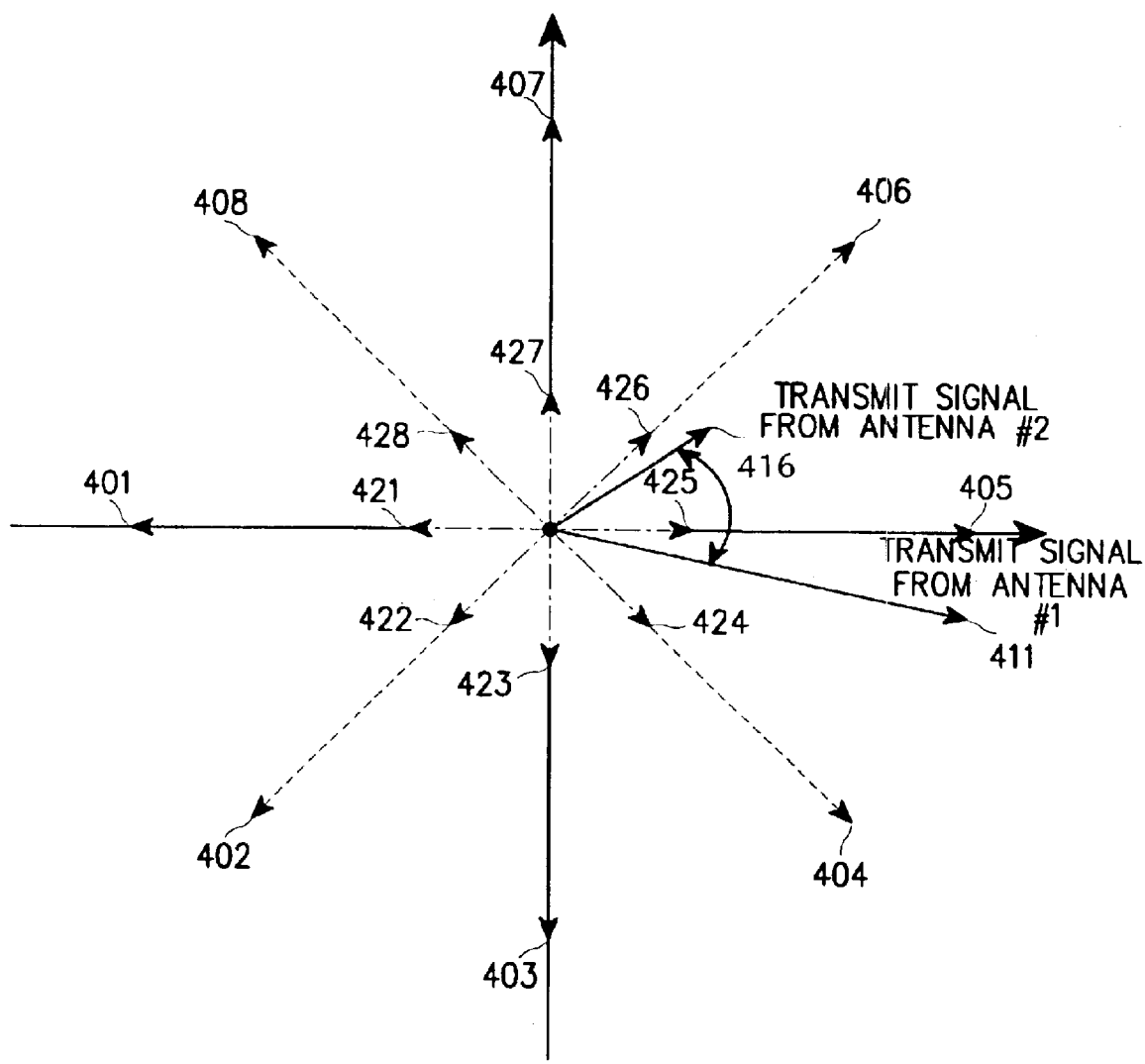
FIG. 4 illustrates parameters in vectors of a feedback signaling message on a coordinate plane in the transmitting device.
Figure 5:
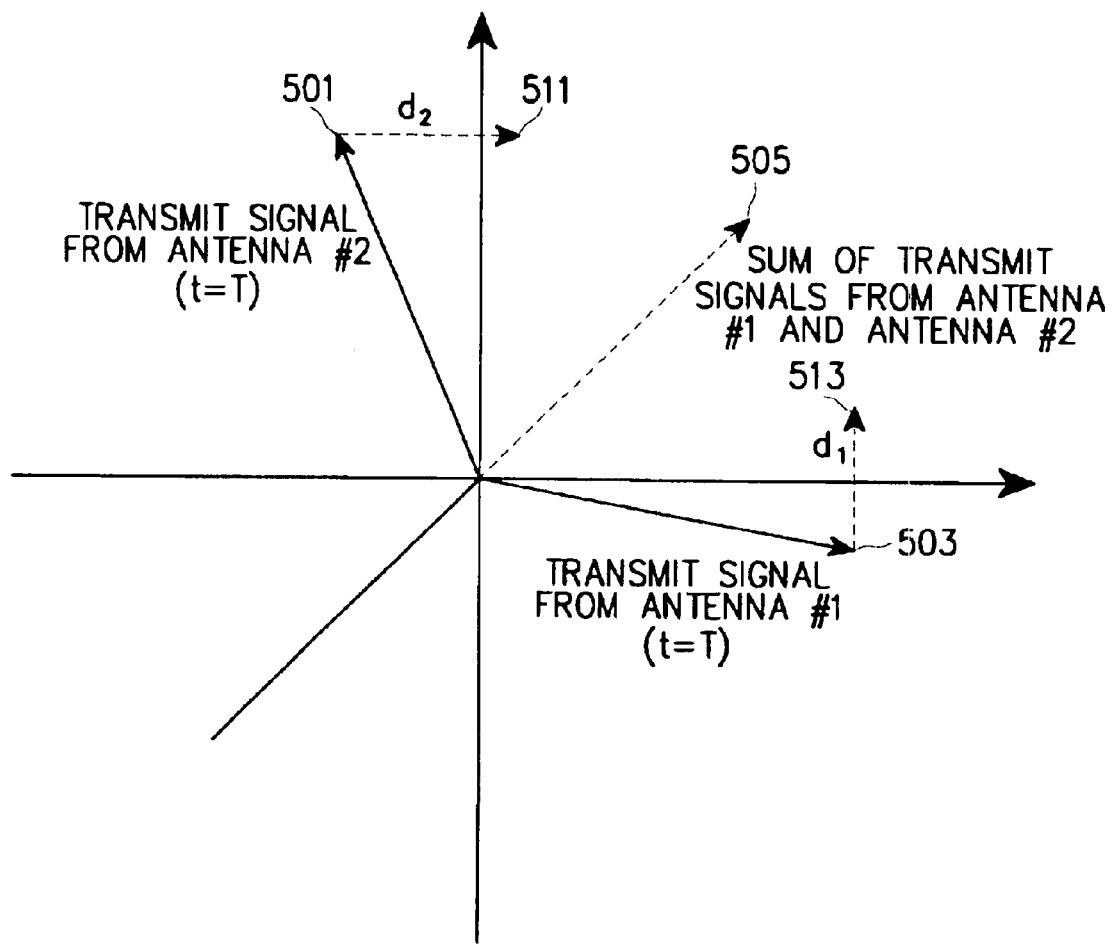
FIG. 5 illustrates parameters in vectors of a feedback signaling message in a three-dimensional space according to an embodiment of the present invention.

FIG. 5 illustrates a procedure of searching for an optimum weight vector to be applied to each antenna, and the physical implication of differential weight vectors used in the optimum weight vector search. Optimum differential vectors are searched for by the terminal. The base station calculates weight vectors for the plurality of antennas based on the differential vectors, which are fed back from the terminal.

In FIG. 5, a vector 503 represents a signal received at the terminal from antenna #1 180 of the base station at time t=T and a vector 501 represents a signal received at the terminal from antenna #2 181 of the base station at time t=T. A vector 505 is the sum of the vectors 501 and 503, i.e., the sum of the signals from antennas #1 and #2.

Vectors 511 and 513 are differential weight vectors to be used for setting new weight vectors for the transmission signals of antennas #1 and #2, respectively. The differential weight vectors 511 and 513 make the difference between the vectors 501 and 503 minimal. The terminal calculates such differential weight vectors and transmits them to the base station. The base station can apply optimum weight vectors to the plurality of antennas using the differential weight vectors that maximize signal strength at time T+1.

To transmit information about the weight vector w to the base station, the terminal refers to a look-up table D with differential weight vectors (or differential vectors). The look-up table D lists differential weight vectors d, and indexes representing the differential weight vectors d*. The weight vector information transmitted to the base station by the terminal is the indexes of the differential weight vector d*. The terminal calculates optimum weight vectors [d*] using the differential weight vectors d* in steps <M1>, <M2>, <M3>, and <M4>.

In <M1>, the terminal calculates the optimum differential vectors d* by $$d_* = \arg\max \frac{(e[l] + \alpha d)^H H_k^H H_k (e[l] + \alpha d)}{\|e[l] + \alpha d\|^2} d \in D \quad (10)$$

and transmits the index of the optimum differential vectors d* to the base station in <M2>. In <M3>, the terminal re-sets normalized weight vectors using the optimum differential vectors d* calculated in <M1> by $$e[l+1] = \frac{e[l] + \alpha d_*}{\|e[l] + \alpha d_*\|} \quad (11)$$

Then, the terminal substitutes e[l+1] for e[l] calculated in <M3> in <M4> and returns to <M1> to repeat the above steps.

Steps <M1> to <M4> will be described in detail on the assumption that the base station has two antennas. While one of the antennas is designated as a reference antenna and only a weight for the other antenna is re-set in the conventional method, the weight of each antenna is re-set in the preferred embodiment of the present invention. Differential weight vectors for use in re-setting the weight of each antenna are listed as vectors in the look-up table D and both the base station and the terminal are provided with such look-up tables. The terminal calculates differential weight vectors with maximum values by subjecting all differential weight vectors included in the look-up table D to Eq. (10) and transmits the indexes of the calculated differential weight vectors to the base station through the D field of the FBI field on an uplink DPCCH. Here, one index bit is loaded in each D field and thus all the index bits are transmitted over four slots.

As the size of the look-up table D increases, optimum weight vectors can be calculated more accurately. However, the increased size of the look-up table D, in turn, increases the length of a channel environment information set transmitted to the base station and computation time, since all differential weight vectors of the look-up table D should be computed by Eq. (10) in step <M1>. Therefore, optimal size and optimum weight calculation performance should be considered in making the look-up table D.

Let a normalized weight vector for a $k^{th}$ antenna among the antennas of the base station be e*. The normalized weight vector e* exists in an L-dimensional complex vector space (L is the number of the antennas). Since the normalized weight vector e* is searched for using Eq. (10) and Eq. (11) with the use of the differential weight vectors of the look-up table D, any linear combination of the differential weight vectors should form the L-dimensional complex vector space. This condition is a necessary condition for the normalized weight vector e* to be present within the L-dimensional complex vector space. This necessary condition will be referred to as <condition 1>.

If an initial value e[0] of the normalized weight vector e* applied to an antenna is included in the look-up table D satisfying <condition 1>, the initial value e[0] and a normalized weight vector e[l] (l=1, 2, . . . ) resulting from calculating the differential weight vectors of the look-up table D by Eq. (10) and Eq. (11) can be expressed in linear combination as $$e[l] = \sum_{p=1}^{|D|} u_p[l] d_p, \quad l \geq 1, u_p[l] \geq 0, p = 1, 2, \ldots, |D| \quad (12)$$

where $u_p[l]$ denotes non-negative weights of differential weight vectors shown in the look-up table D. The linear combination of the differential weight vectors with the non-negative weights is called a conic combination. By applying the conic combination to Eq. (11), the normalized weight vector e[l] is a vector within a convex cone formed by differential weight vectors $d_p$ included in the look-up table D. In other words, the convex cone, which is derived from conic combination of length-L differential weight vectors in the look-up table D, is supposed to be inside the L-dimensional complex space. This condition is a necessary condition for generating the look-up table D, called <condition 2>.

Figure 6:
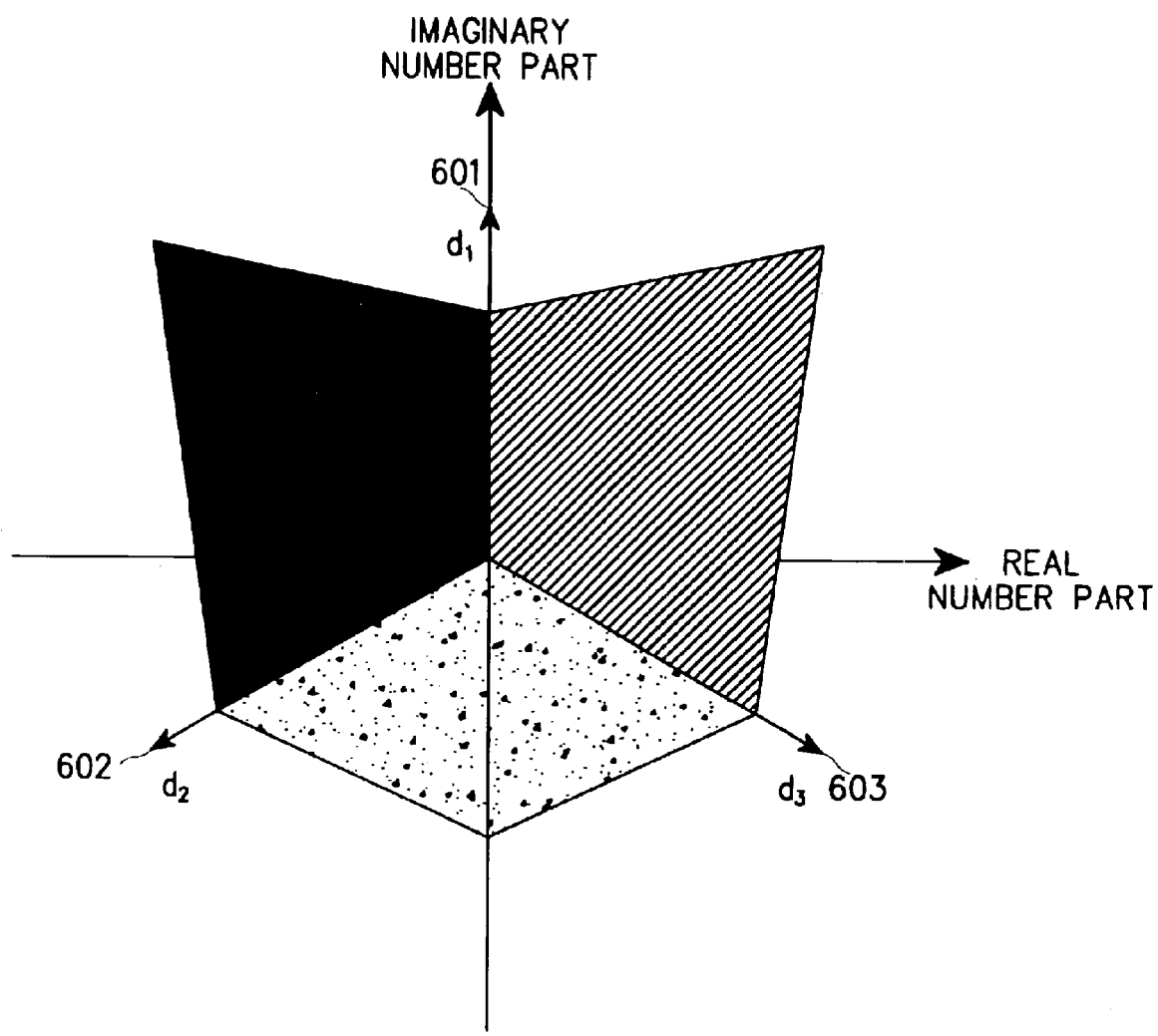
FIG. 6 illustrates a convex cone located within a two-dimensional complex space according to the embodiment of the present invention.

For better understanding of <condition 2>, FIG. 6 will be referred to. FIG. 6 illustrates a convex cone located within a two-dimensional complex space (L=2) with minimum elements. The whole area of the convex cone can be expressed as linear combinations of vectors 601, 602, and 603.

It follows from the above notion that an L-dimensional convex cone (L>2) could be formed within an L-dimensional complex space (L>2) by searching for appropriate vectors. In view of L=the number of base station antennas, optimum weight vectors for the L transmission antennas of the base station can be calculated in Eq. (10) and Eq. (11) by searching for differential weight vectors suitable for forming a convex cone that represents the L-dimensional complex space and making a look-up table D with the differential weight vectors.

A look-up table D with too large a size increases the size of a feedback signaling message directed from the terminal to the base station and time required to calculate optimum weight vectors. Therefore, making of a look-up table D capable of representing the L-dimensional complex space with minimum elements is a necessary but difficult task. A look-up table $D_{all}$, given by $$D_{all} = \left\{ \frac{1}{\sqrt{2}} [(\pm 1 \pm j)_1 \ldots (\pm 1 \pm j)_L]^T \right\} \quad (13)$$

is the largest of look-up tables D with differential weight vectors by which an L-dimensional complex plane satisfying <condition 2> can be expressed.

For L=1 in Eq. (13), the look-up table $D_{all}$ representing a one-dimensional complex space has four vectors. It needs one more vector as compared to the look-up table D representing the one-dimensional complex space with minimum elements, say, three vectors, shown in FIG. 6. $4^L$ differential vectors are required to represent the L-dimensional complex space with the use of look-up table $D_{all}$ and 2L information bits are required for the terminal to transmit information about the $4^L$ differential vectors to the base station. Despite the advantage that look-up table $D_{all}$ satisfies <condition 1> and <condition 2>, its great size results in the increase of a channel environment information set transmitted to the base station and optimum weight vector computation time. Hence, a new look-up table $D_4$ satisfying <condition 1> and <condition 2> is used in the preferred embodiment of the present invention.

$$D_4 = [1 - 1 \; j - j] \hat{x} \; I_{L \times L} = [I_{L \times L} - 1_{L \times L} \; j \; I_{L \times L} - j I_{L \times L}] \quad (14)$$

where $\hat{x}$ denotes Kronecker multiplication and $I_{L \times L}$ is an L-order identical matrix. The look-up table $D_4$ is a matrix with 4L row vectors. If L=1 in Eq. (13), four vectors are required to represent a one-dimensional complex space with the look-up table $D_4$ like the look-up table $D_{all}$. On the other hand, if L=2, the look-up table $D_{all}$ needs 16 vectors while the look-up table $D_4$ needs only 8 vectors to represent a two-dimensional complex space. As the dimension of a complex space is increased, that is, the base station has more antennas, the look-up table $D_{all}$ requires more vectors than the look-up table $D_4$ to represent the L-dimensional complex space. Because there are $\log_2(4L)$ indexes in the look-up table $D_4$, as L increases, the number of the indexes of the look-up table $D_4$ is smaller than that of the look-up table $D_{all}$ by 2L.

Table 3 is an example of the look-up table $D_4$ for the case that the base station has two antennas according to the preferred embodiment of the present invention.

In Table 3, $d_{1,i}$ and $d_{2,i}$ are $i^{th}$ differential weight vectors applied to antenna #1 and antenna #2, respectively. By applying Table 3 to Eq. (10) in <M1>, optimum differential weight vectors can be searched for. Then, optimum weight vectors can be calculated by Eq. (11) using the optimum differential weight vectors.

TABLE 3

| differential weight vector | index | | | | | | | |
|---|---|---|---|---|---|---|---|---|
| | 0 | 1 | 2 | 3 | 4 | 5 | 6 | 7 |
| $d_{1,I}$ | 1 | 0 | −1 | 0 | j | 0 | −j | 0 |
| $d_{2,I}$ | 0 | 1 | 0 | −1 | 0 | j | 0 | −j |

α is multiplied in applying the differential weight vectors shown in Table 3 to Eq. (10) in order to control the magnitude of the differential weight vectors. α is empirically obtained depending on the channel environment between the base station and the terminal. One factor of the channel environment is the moving speed of the terminal. If the terminal roams at or below 10 Km/h, it is known that the optimal value of α is 0.3 in a simulation according to the preferred embodiment of the present invention. If α is too small, and if the current weight vector is very different from the weight vector to be subsequently applied, it is impossible to approach the subsequent optimum weight vector during updating of weight vectors. In contrast, if α is too large, and if the current weight vector is not so different from the subsequent weight vector, it is difficult to search for an appropriate weight vector. Therefore, α should be set to an appropriate value according to the current channel environment between the base station and the terminal. The set value of α can be transmitted to the terminal on the downlink.

Upon receipt of the index of the differential weight vectors from the terminal in <M2>, the base station sets optimum weight vectors in steps <B1>, <B2>, and <B3>.

In <B1>, the base station calculates the normalized vectors e[l+1] by Eq. (11) using the differential weight vectors corresponding to the received indexes.

In <B2>, the base station calculates a next weight vector for each antenna using the normalized vectors e[l+1] and current weight vectors $w_k$ by $$w_k[l+1] = \sqrt{P_k} e[l+1] \quad (15)$$

In <B3>, after setting $w_k[l]$ calculated in <B2> to $w_k[l+1]$, the base station repeats the above steps, starting from <B1>.

$P_k$ in Eq. (15) denotes the transmit signal power of each antenna. In the process of calculating optimum weight vectors, the base station should use the same initial normalized vector value as the terminal. Otherwise, the base station and the terminal calculate different normalized weight vectors as the normalized weight vector computation repeats. Consequently, the weight vectors of the base station may not be optimum weight vectors in the real channel environment. Furthermore, a possibly generated error during transmission of a differential weight vector index to the base station may reduce performance.

In view of the foregoing, weight vectors are transmitted in two ways to prevent such initial value setting errors and transmission errors in the preferred embodiment of the present invention.

Figure 7:
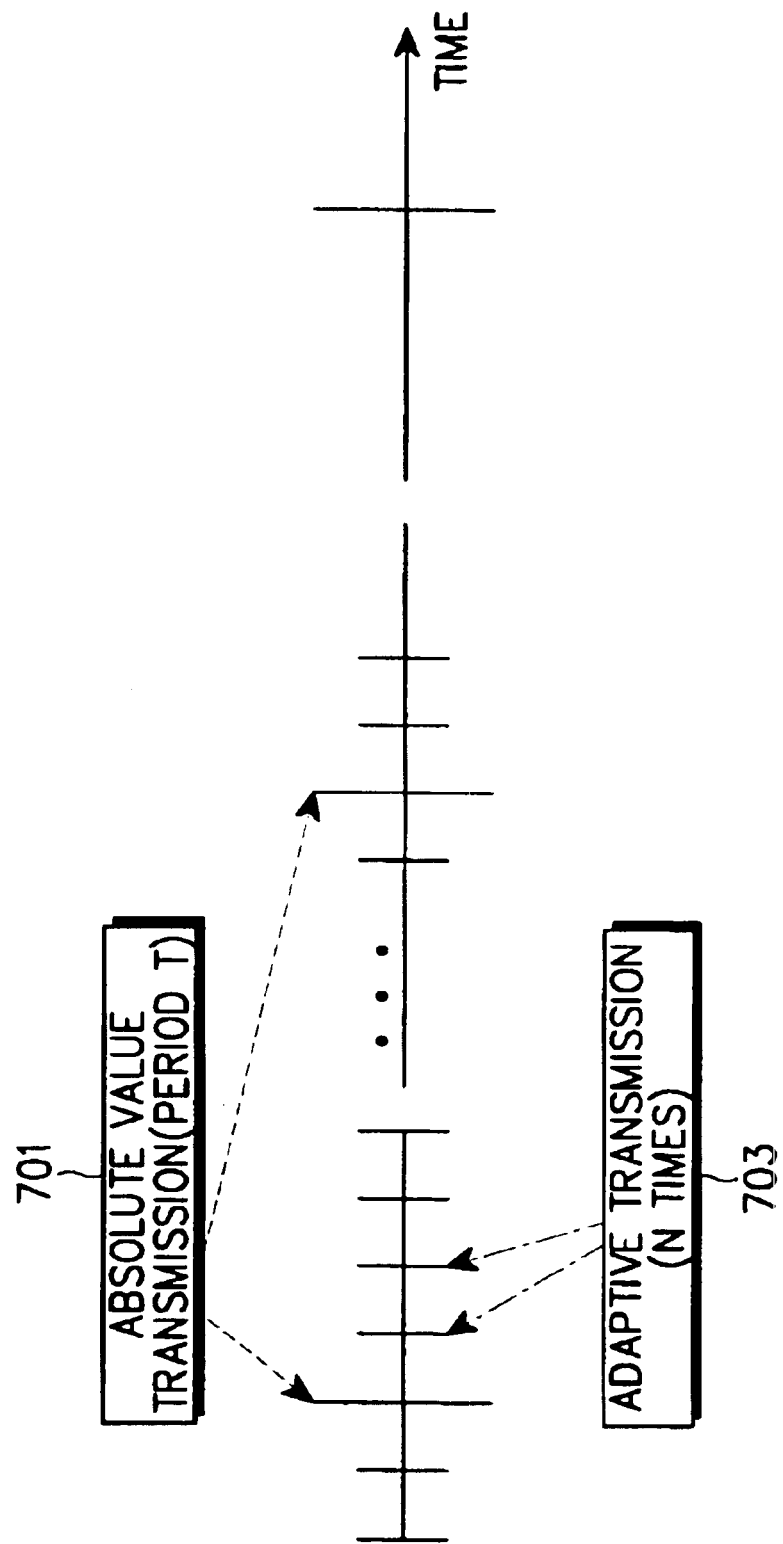
FIG. 7 illustrates a weight transmitting method according to the embodiment of the present invention.

FIG. 7 depicts weight vector transmission according to the preferred embodiment of the present invention. Referring to FIG. 7, reference numeral 701 denotes transmission of the absolute values of weight vectors. After that, the indexes of differential vectors as provided according to the 3GPP standards are transmitted. In this weight vector transmission, weight vectors in the base station and the terminal are set to the same value periodically to thereby prevent the deterioration of system performance caused by calculation errors encountered in adaptive transmission and errors generated during transmission of the differential weight vector index. The differential weight vector index that the terminal transmits according to the standards is the most approximate to the channel environment of a downlink channel as measured in the mobile terminal.

Reference numeral 703 denotes adaptive transmission by which the differential signal of a weight vector is transmitted. The weight vector index transmitted in step 703 is the index of differential weight vectors.

A period T in which the absolute value of a weight vector is transmitted is set to an arbitrary value. The period T is generally obtained empirically depending on the moving speed of the terminal. The number N of adaptive transmission occurrences for the period T is also set to an arbitrary value. The number N is also obtained empirically depending on the moving speed of the terminal.

How weight vectors are calculated according to the preferred embodiment of the present invention will be clearly understood from the following description. For simplification of equations, it is assumed that the base station has two antennas.

Normalized weight vectors applied to antenna #1 and antenna #2 are expressed in a matrix as $$e[l] = \begin{bmatrix} e_1[l] \\ e_2[l] \end{bmatrix} \quad (16)$$

and differential weight vectors given by $$d = \begin{bmatrix} d_1 \\ d_2 \end{bmatrix} \quad (17)$$

are used to obtain the normalized weight vectors.

In Eq. (16), $e_1[l]$ and $e_2[l]$ are the normalized weight vectors applied respectively to antenna #1 and antenna #2 and have complex values. The differential vector calculated in Eq. (17) is shown in Table 3 and has a complex value, for use in obtaining an optimum differential vector in Eq. (10).

From Eq. (16) and Eq. (17), $$\varepsilon = \begin{vmatrix} \varepsilon_1 \\ \varepsilon_2 \end{vmatrix} = \begin{vmatrix} e_1[l] + ad_1 \\ e_2[l] + ad_2 \end{vmatrix} \quad (18)$$

where ε=Normalized estimation weight vector

A channel estimation matrix defined as $$H_{M \times L} = H_{1 \times 2} = [h_1 j_2] \quad (19)$$

is used to estimate a channel by the use of signals received at the terminal from antenna #1 and antenna #2 of the base station. Here, M is the number of fingers which receive base station transmit signals at the mobile terminal and L is the number of transmission antennas used by the base station. The preferred embodiment of the present invention is described on the assumption that the terminal has one finger and the base station has two transmission antennas.

By applying Eq. (18) and Eq. (19) to Eq. (10), $$d^* = \arg\max \frac{\varepsilon^H H^H H \varepsilon}{\|\varepsilon\|^2} d \in D \quad (20)$$

where $\epsilon^H$ and $H^H$ are the conjugate transpose matrixes of $\epsilon$ and H. The numerator of Eq. 20 is calculated to $$\varepsilon^H H^H H \varepsilon = [\varepsilon_1^* \ \varepsilon_2^*] \begin{vmatrix} h_1^* \\ h_2^* \end{vmatrix} [h_1 \ h_2] \begin{vmatrix} \varepsilon_1 \\ \varepsilon_2 \end{vmatrix} \quad (21)$$

$$= (\varepsilon_1^* h_1^* + \varepsilon_2^* h_2^*)(h_1 \varepsilon_1 + h_2 \varepsilon_2)$$

$$= |\varepsilon_1|^2 |h_1|^2 + |\varepsilon_2|^2 |h_2|^2 + \varepsilon_1^* h_1^* h_2 \varepsilon_2 + \varepsilon_2^* h_2^* h_1^* \varepsilon_1$$

and the denominator of Eq. (20) is calculated to $$\|\varepsilon\|^2 = [\varepsilon_1^* \ \varepsilon_2^*] \begin{vmatrix} \varepsilon_1 \\ \varepsilon_2 \end{vmatrix} = |\varepsilon_1|^2 + |\varepsilon_2|^2 \quad (22)$$

Eq. (21) and Eq. (22) are detailed examples of Eq. (10) in the case of two base station antennas and one terminal finger. By Eq. (21) and Eq. (22), the terminal searches for optimum differential vectors to be applied to the transmission antennas of the base station. The optimum differential vectors are included in the look-up table D and a channel environment information set transmitted to the base station is the index of the optimum differential vectors. If the base station has two antennas, the index of the optimum differential vectors is three bits.

Figure 8:
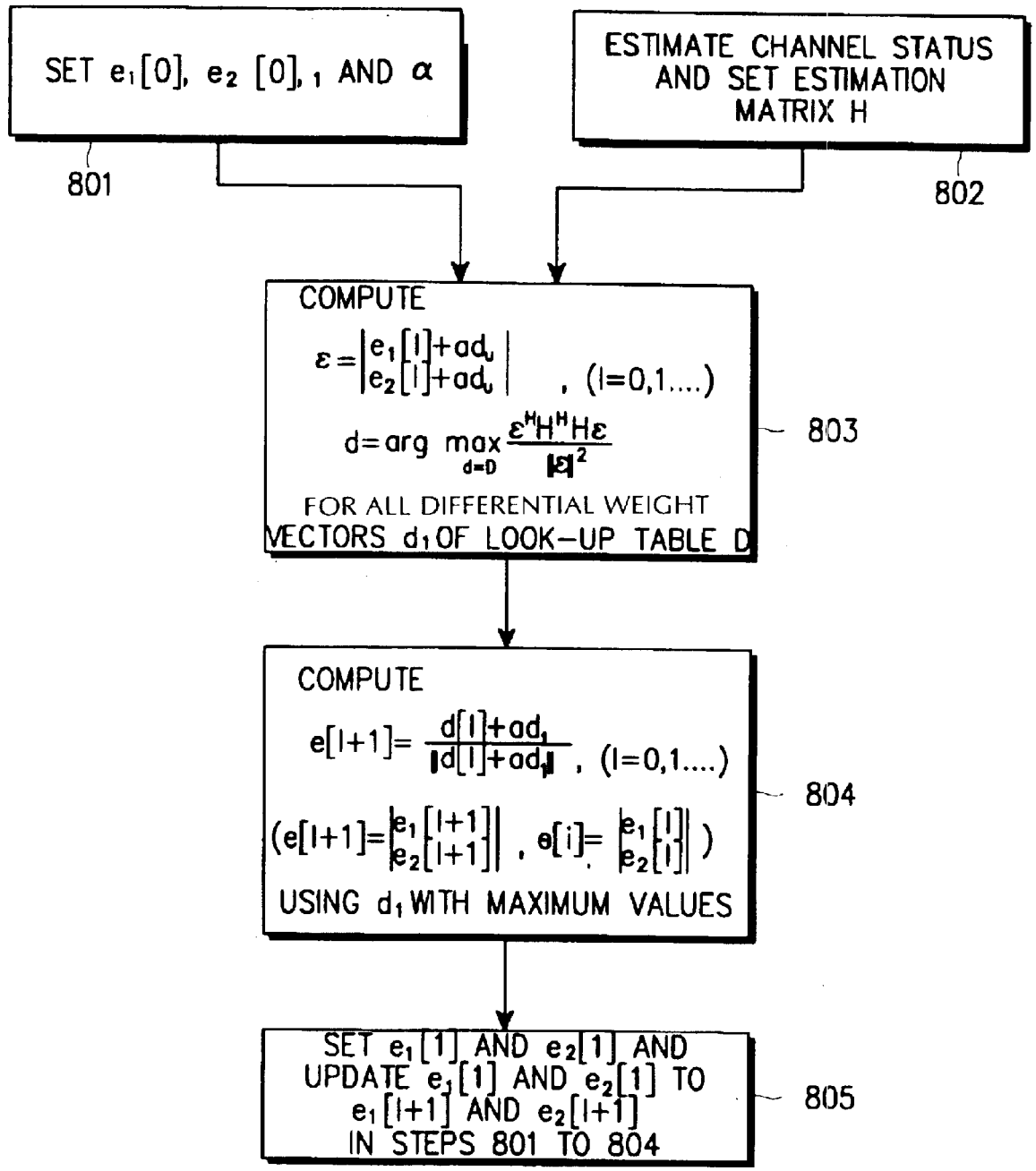
FIG. 8 is a flowchart illustrating an optimum weight vector calculating method according to the embodiment of the present invention.

FIG. 8 is a flowchart illustrating a method of calculating optimum weight vectors according to the preferred embodiment of the present invention. The following description is conducted on the assumption that the base station has two transmission antennas.

Referring to FIG. 8, initial values are set for computation of weight vectors in step 801. The initial values include initial weight values $e_1[0]$, $e_2[0]$, and $\alpha$. The initial weight values $e_1[0]$ and $e_2[0]$ are shown in the look-up table D. The reason for selecting the initial weight values from the look-up table D is to satisfy <condition 1> and <condition 2> as described in connection with the look-up table D. $\alpha$ is set according to the signal transmission channel environment between the transmission antennas of the base station and an antenna of the terminal. The moving speed of the terminal is an example channel environment.

In step 802, the channel estimation matrix H is set for weight computation according to the preferred embodiment of the present invention by analyzing the channel environment. The terminal analyzes transmit signals received from antenna #1 and antenna #2 and sets channel estimation matrixes H between antenna #1 and the terminal antenna and between antenna #2 and the terminal antenna. Each channel estimation matrix H has as many rows as the terminal has fingers for receiving signals from the base station and as many columns as the base station has antennas. It is assumed here that the terminal has one finger and the base station has two transmission antennas.

In step 803, optimum differential vectors are calculated using the values set in steps 801 and 802, for use in computation of optimum weights. The optimum weights are weights applied to antenna #1 and antenna #2 to maximize the strength of signals received at the terminal from the base station. To achieve the optimum weights, differential vectors $d_i$ with maximum values are searched for by computing the equation shown in block 803 in FIG. 8 with respect to all the differential weight vectors $d_i$ in look-up table D.

In step 804, normalized weights are calculated for the transmission antennas of the base station using the differential weight vectors $d_i$ searched in step 803. Weights to be assigned to the antennas are calculated by multiplying the normalized vectors by transmission signal power P. Optimum normalized weights are achieved by computing the equation in a block 804 using the differential weight vectors $d_i$ and $\alpha$.

In step 805, $e_1[1]$ and $e_2[1]$ calculated in step 804 are set as the normalized weights for antenna #1 and antenna #2, respectively. Then, updating of $e_1[1]$ and $e_2[1]$ to $e_1[1+1]$ and $e_2[1+1]$ is repeated by repeating steps 801 to 804 using normalized weights. Here, l is a positive integer incremented by one from 1.

Figure 9:
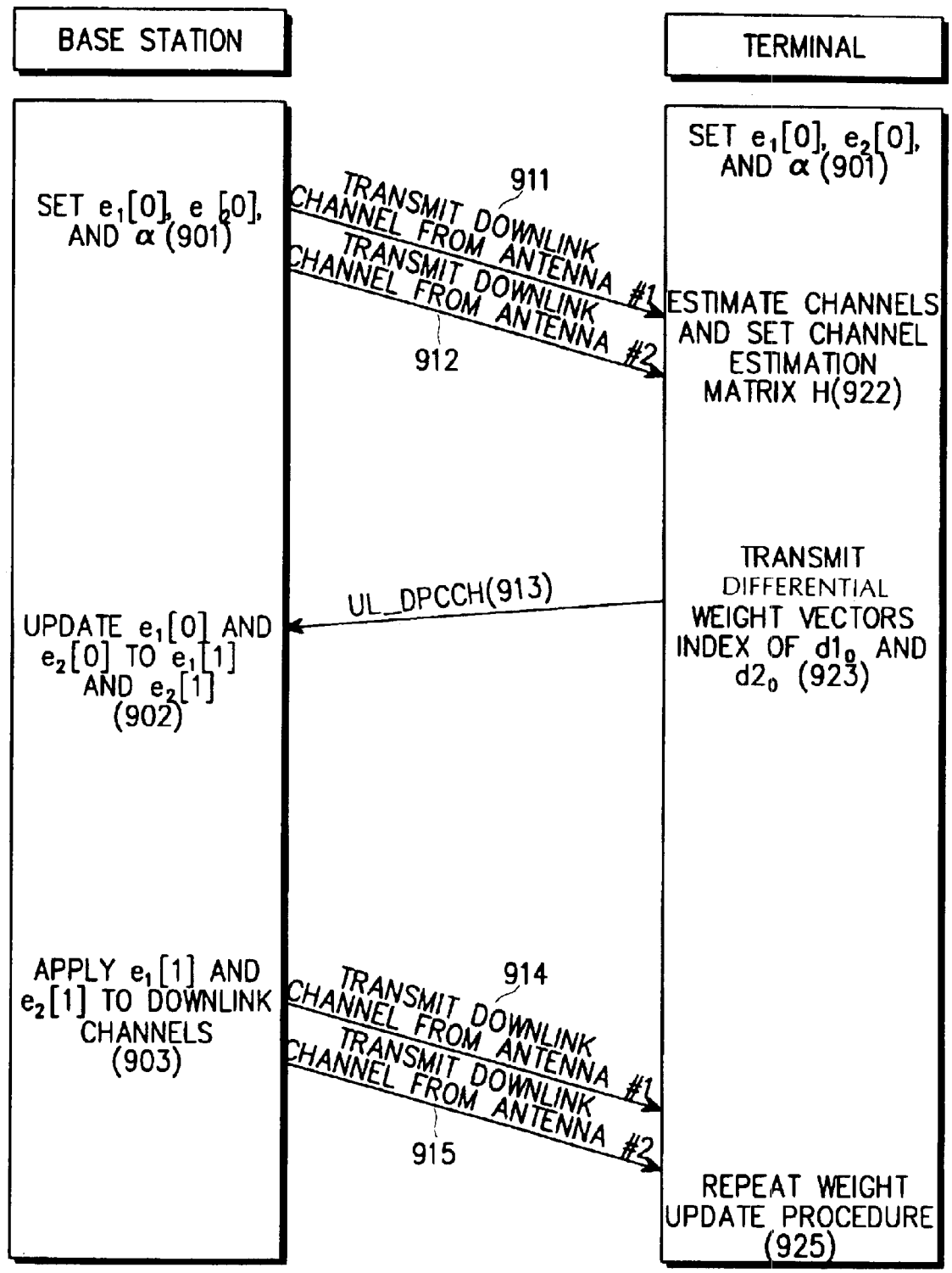
FIG. 9 is a flowchart illustrating the operations of a base station and a terminal according to the embodiment of the present invention.

FIG. 9 is a flowchart illustrating the operations of a base station with two antennas and a mobile terminal according to the preferred embodiment of the present invention.

Referring to FIG. 9, the base station sets initial weight vectors $e_1[0]$ and $e_2[0]$ for the antennas and sets $\alpha$ in step 901. In step 921, the terminal sets the same initial weight vectors $e_1[0]$ and $e_2[0]$ for the antennas and sets $\alpha$. As stated before in connection with look-up table D, the initial weight vectors $e_1[0]$ and $e_2[0]$ are selected from look-up table D so that weights calculated after the initial weight vectors $e_1[0]$ and $e_2[0]$ can be expressed in terms of differential vectors shown in look-up table D. $\alpha$ is a coefficient used in calculating differential weight vectors and normalized weight vectors in Eq. (10) and Eq. (11).

The same values should be set in the base station and the terminal in steps 901 and 921. If they are different, the resulting error may deteriorate system performance. Reference numerals 911 and 912 denote transmission of downlink channels through antenna #1 and antenna #2. The downlink channels include channels dedicated to specific terminals within the base station and channel common to all the terminals within the coverage area of the base station.

Upon receipt of the downlink channels, the terminal estimates channels directed from the base station to the terminal using a P_CPICH and an S_CPICH among the received downlink channels and sets the channel estimation matrix H. The P_CPICH and S_CPICH are transmitted through antenna #1 and antenna #2, respectively.

In step 923, the terminal transmits the index of the differential weight vectors $d1_0$ and $d2_0$ which are calculated by the channel estimation matrix H and Eq. (10), on an uplink DPCCH. The index is transmitted through the D field assigned for closed-loop transmission antenna diversity in the FBI field for transmission of feedback information.

In step 902, the base station updates the initial weight values $e_1[0]$ and $e_2[0]$ to $e_1[1]$ and $e_2[1]$ by applying the index of $d1_0$ and $d2_0$ received from the terminal to Eq. (11). In step 903, the base station applies weights calculated by Eq. (12) using the updated normalized weights $e_1[1]$ and $e_2[1]$ to a downlink dedicated channel and transmits the downlink dedicated channel along with other downlink channels through antenna #1 and antenna #2. Reference numerals 914 and 915 denote transmission of downlink channels including the weights-applied downlink channels.

In step 925, the terminal repeats the weight updating procedure. That is, steps 922, 923, and 924 are repeated using the P_CPICH and S_CPICH among the received downlink channels.

Figure 10:
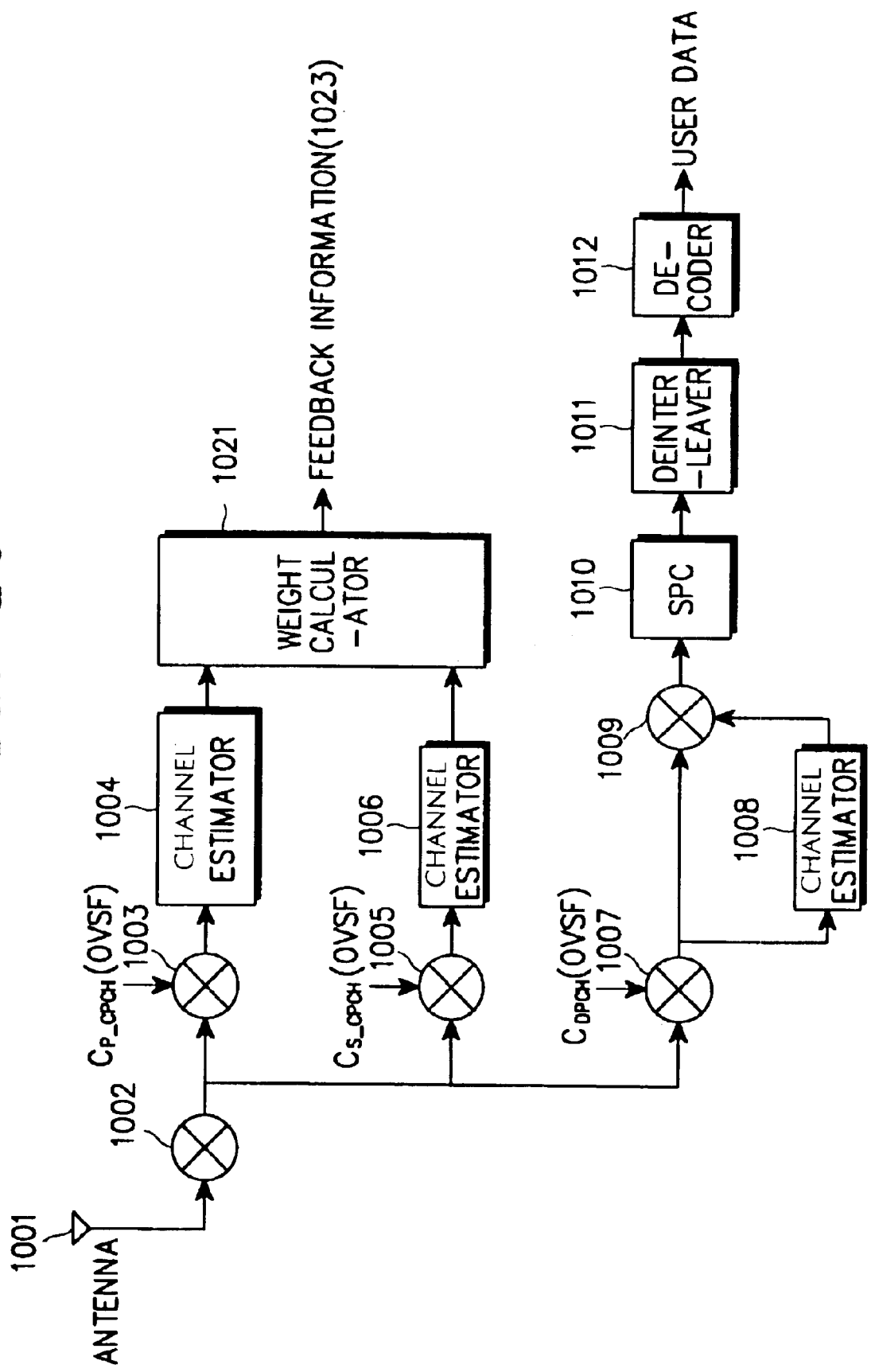
FIG. 10 is a block diagram of a downlink channel receiving device in a mobile communication system according to the present invention.

FIG. 10 is a block diagram of a receiving device at the terminal according to the preferred embodiment of the present invention.

Referring to FIG. 10, an antenna 1001 receives a downlink channel from the base station. A multiplier 1002 recovers the original signal by descrambling the downlink channel signal with the same scrambling code as used in the base station.

Multipliers 1003, 1005, and 1007 multiply the output signal of the multiplier 1002 by channel codes and output despread channel signals. The multiplier for a common channel is not shown in FIG. 10. To be specific, the multiplier 1003 recovers a P_CPICH by multiplying the downlink channel signal received from the multiplier 1002 by the same OVSF code as assigned to the P_CPICH in the base station. The multiplier 1005 recovers a S_CPICH by multiplying the downlink channel signal received from the multiplier 1002 by the same OVSF code as assigned to the S_CPICH in the base station. The multiplier 1007 recovers a DPCH by multiplying the downlink channel signal received from the multiplier 1002 by the same OVSF code as assigned to the DPCH in the base station.

The signals P_CPICH and S_CPICH output from the multipliers 1003 and 1005 are fed to their corresponding channel estimators 1004 and 1006. The P_CPICH is a channel transmitted through antenna #1 180 from the base station and allows a downlink channel directed from antenna #1 180 to a subscriber device to be estimated. The S_CPICH is a channel transmitted through antenna #2 181 from the base station and allows a downlink channel directed from antenna #2 180 to the subscriber device to be estimated. The channel estimator 1004 achieves a channel estimation matrix to compute a differential weight vector from the P_CPICH received from the multiplier 1003. The channel estimator 1006 achieves a channel estimation matrix to compute a differential weight vector from the S_CPICH received from the multiplier 1005. A weight calculator 1021 calculates the differential weights using the channel estimation matrixes H received from the channel estimators 1004 and 1005 and normalized weight vectors $e_1[k]$ and $e_2[k]$ that are updated to the same values as in the base station and transmits the indexes of the differential weight vectors. The feedback information 1023 is the indexes of the differential weight vectors that are transmitted to the base station through the D field in an FBI field of an uplink DPCCH. After updating the normalized weight vectors using the feedback information, the base station generates optimum vectors by multiplying the signal power of the antennas by the normalized weight vectors.

A channel estimator 1008 estimates a channel using the DPCH received from the multiplier 1007. A multiplier 1009 recovers an original DPCH signal by multiplying the DPCH received from the multiplier 1007 by the conjugate of the DPCH estimated by the channel estimator 1008. A serial-to-parallel converter (SPC) 1010 outputs only a data channel DPDCH from the DPCH received from the multiplier 1009 to a deinterleaver 1011. A DPCCH including the physical layer control commands of TFI and TPC and pilot bits is extracted from the DPCH by the SPC 1010 to be used for their inherent purposes.

The deinterleaver 1011 reorders the DPDCH and a decoder 1012 decodes the deinterleaved channel signal to thereby obtain the original user data as it appeared prior to channel encoding.

Figure 11:
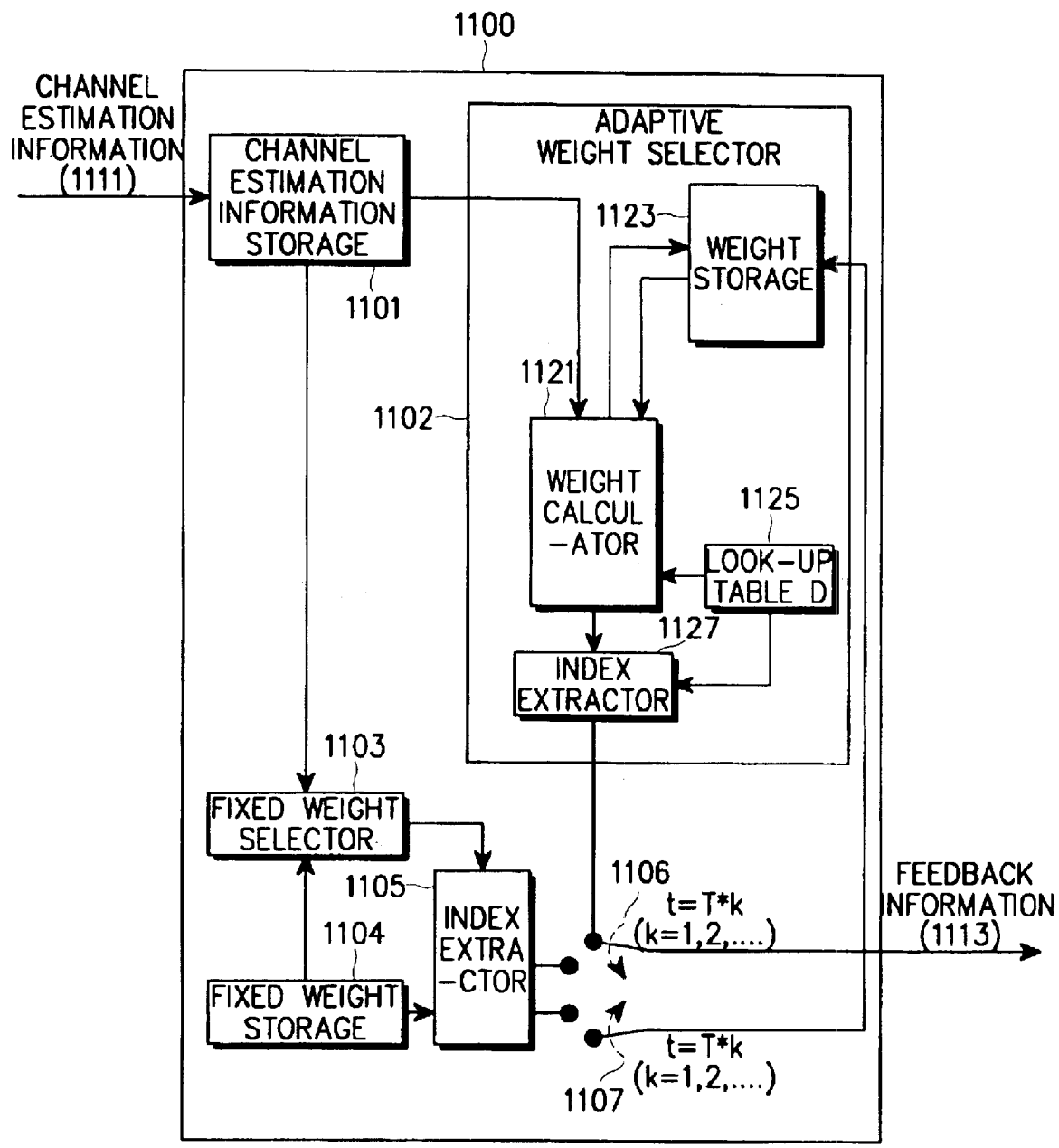
FIG. 11 is a block diagram of a weight calculator shown in FIG. 10.

FIG. 11 is a block diagram of the weight calculator 1021 shown in FIG. 10. In FIG. 11, reference numeral 1100 denotes the weight calculator 1021. Channel estimation information 1111 is information about the signal transmission channel environment between antenna #1 and the terminal antenna and between antenna #2 and the terminal antenna. The channel estimation information 1111 is fed to the weight calculator 1100 shown in FIG. 11 from the channel estimators 1004 and 1006 shown in FIG. 10. The weight calculator 1100 stores the input channel estimation information 1111 in a channel estimation information storage 1101 to be used in an adaptive weight selector 1102 and a fixed weight selector 1103.

The fixed weight selector 1103 selects a fixed weight that maximizes the strength of a transmit signal received at the terminal from the base station based on the channel estimation information received from the channel estimation information storage 1101. Eight fixed weights #0 to #7 are stored in a fixed weight storage 1104. What the indexes represent is shown in Table 2. An index extractor 1105 compares the selected fixed weight received from the fixed weight selector 1103 with a fixed weight received from the fixed weight storage 1104, extracts the index of the selected fixed weight, and transmits it to the base station. The index of the fixed weight is transmitted to the base station and a weight storage 1123 every period of T. T is determined by the downlink signal transmission channel environment between the base station and the terminal.

The reason for transmitting the index of the fixed weight to the base station every period of T has been described before referring to FIG. 7. The index of the fixed weight is used to re-set a weight stored in the weight storage 1123. The re-set weight is the same in the base station and the terminal.

The adaptive weight selector 1102 is comprised of a weight calculator 1121, a weight storage 1123, a look-up table D 1125, and an index extractor 1127. The weight calculator 1121 calculates a differential weight vector with a maximum value by Eq. (10) with the channel estimation information, the weight, and the differential vectors received respectively from the channel estimation information storage 1101, the weight storage 1123, and the look-up table 1125 and then an optimum normalized weight with the obtained differential vector by Eq. (11).

The weight storage 1123 stores normalized weights calculated by the weight calculator 1121 and transmits them to the weight calculator 1121 after they are used for antenna #1 and antenna #2 in the base station, so that the weight calculator 1221 can calculate differential vectors with maximum values and then optimum normalized weights based on the differential vectors. The weight storage 1123 re-sets its stored weights to the values indicated by the index of the fixed weight received from the index extractor 1105 for the purpose of adaptive transmission and index transmission as stated above in connection with FIG. 7. The re-set weights should be equal in the base station and the terminal. Otherwise, errors may occur in calculating adaptive weights, deteriorating system performance.

The look-up table 1125 is a device for storing the differential vectors shown in the look-up table D of Table 3. The look-up table 1125 has eight differential vectors. The look-up table 1125 transmits the differential vectors to the weight calculator 1121 to help the weight calculator 1121 to calculate the differential vectors with maximum values and the optimum normalized weights. The look-up table 1125 also transmits the differential vectors to the index extractor 1127 to help the index extractor 1127 extract the index of the differential vectors calculated by the weight calculator 1121.

A newly calculated extracted index is transmitted to the base station N times during one period T. N depends on the downlink signal transmit channel environment between the base station and the terminal as described in connection with FIG. 7.

Switches 1106 and 1107 transmit the index of the fixed weight received from the index extractor 1105 to the base station and the index of the fixed weight received from the index extractor 1105 to the weight storage 1123, respectively, every period T.

Feedback information 1113 directed to the base station includes the index of the differential weight vectors or the fixed weight vectors. The fixed weight vector index is transmitted every period T, whereas the differential vector indexes are transmitted N times for one period T. That is, after the index of the differential vectors are transmitted N times, the index of the fixed weight is transmitted for initialization. T and N are determined by the downlink signal transmit channel environment between the base station and the terminal.

Figure 12:
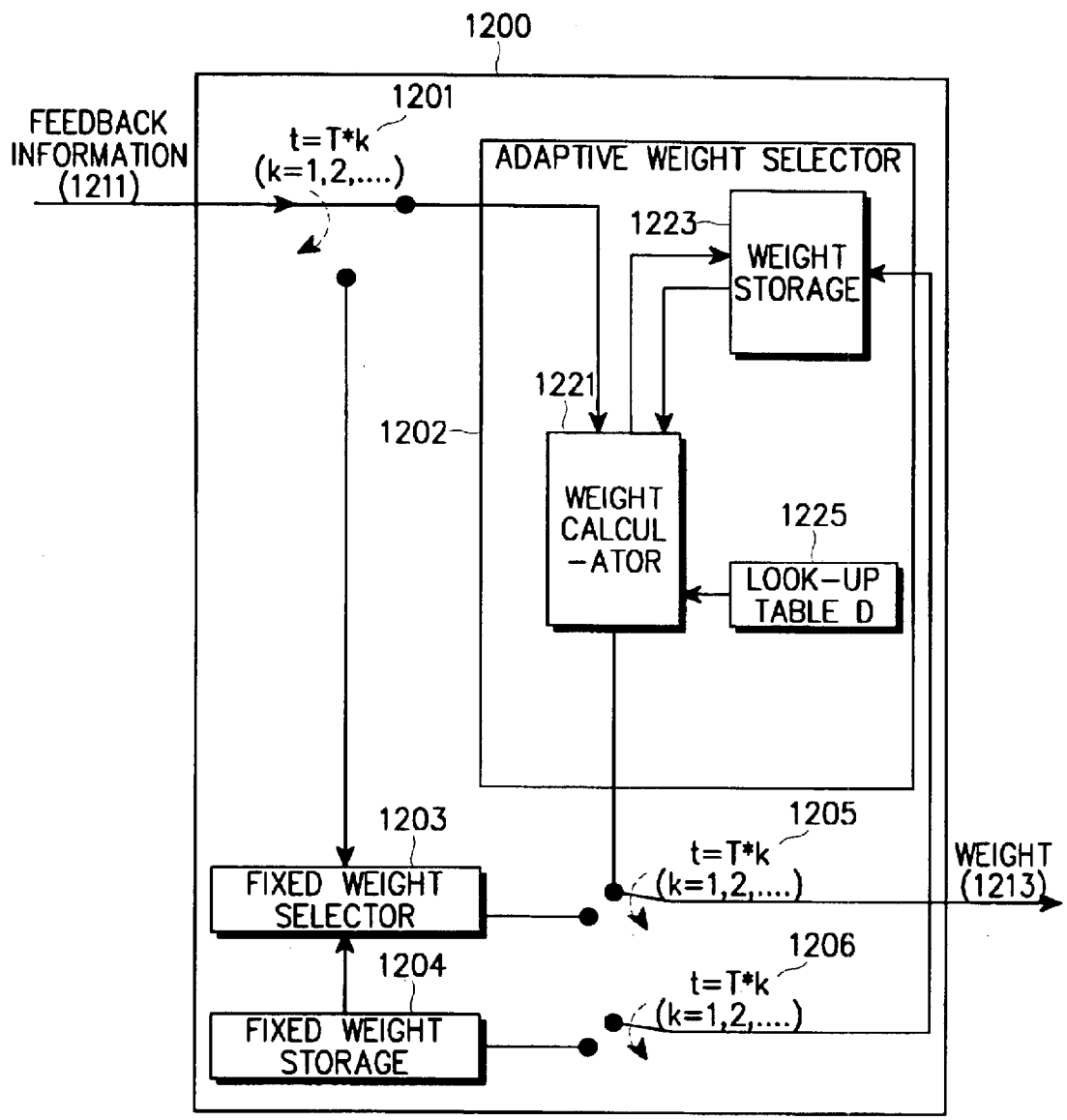
FIG. 12 is a block diagram of a base station weight generator according to the embodiment of the present invention.

FIG. 12 is a block diagram of a weight calculator in the base station, for calculating a weight to be assigned for each antenna based on the feedback information computed by the weight calculator 1100 at the mobile terminal.

Referring to FIG. 12, a switch 1201 receives feedback information 1211 through the FBI field of an uplink DPCCH from the terminal. The feedback information 1211 includes the index of fixed weight vectors or differential weight vectors. The switch 1201 switches to a fixed weight selector 1203 every interval of T, when it outputs a received fixed weight index to the fixed weight selector 1203. At any other time during period T, the switch 1201 switches the feedback information 1211 to a weight generator 1221 in an adaptive weight generator 1202.

The fixed weight selector 1203 selects fixed weights from a fixed weight storage 1204 and outputs the selected fixed weights to a switch 1205, referring to the fixed weight index received from the switch 1201 at every T intervals.

A weight calculator 1221 of the adaptive weight generator 1202 generates weights to be assigned to antenna #1 and antenna #2 based on the feedback information 1211 received from the switch 1201. Specifically, the weight calculator 1221 utilizes weights stored in a weight storage 1223 and differential vectors included in a look-up table D 1225, represented by the feedback information 1221.

The switch 1205 outputs the fixed weights received from the fixed weight selector 1203 at every interval T and adaptive weights received from the weight generator 1221 at any other time instant as weights for the antennas.

In accordance with the present invention as described above, a variable weight is assigned to each antenna used for transmit antenna diversity according to channel status. Therefore, adaptive weight computation is performed in which the current weights are calculated using the previous weights. As a result, a terminal can receive a signal approximate to a real signal transmitted from a base station.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method in a mobile terminal of maximizing the sum of the vectors of signals received from a base station having at least two antennas, comprising the steps of:

calculating vectors of signals received from the antennas of the base station, each of said signals being from a different antenna;

calculating differential vectors for the input signal vectors to maximize the sum of the input signal vectors; and transmitting information about the differential vectors to the base station.

2. The method of claim 1, wherein the differential vectors are calculated by computing the following equation, into which differential vectors set for the antennas in a look-up table are inserted in order to maximize the sum of the vectors of input signals:

$$d_* = \arg\max \frac{(e[l] + \alpha d)^H H_k^H H_k (e[l] + \alpha d)}{\|e[l] + \alpha d\|^2} d \in D$$

wherein $H_K$ is an estimation matrix; $H_K^H$ is a conjugate transpose matrix for H; e[1] is a weight vector; and 1 is the number of antenna.

3. The method of claim 2, wherein the value $\alpha$ is used to control the size of a differential vector.

4. The method of claim 3, wherein the value $\alpha$ is determined by the channel environment between the base station and the mobile terminal.

5. The method of claim 4, wherein the value $\alpha$ is determined by the moving speed of the mobile terminal.

6. The method of claim 2, wherein any linear combination of the differential vectors in the look-up table exists within an L-dimensional complex vector space, where L is the number of antennas at the base station.

7. The method of claim 6, wherein a convex cone formed by linear combination of differential weight vectors with non-negative weights in the look-up table exists within the L-dimensional complex space.

8. The method of claim 2, wherein the look-up table has $4^L$ differential vectors.

9. An transmit antenna diversity apparatus in a mobile terminal for generating weight vectors for the transmission power of each antenna of at least two antennas at a base station of a mobile communication system, comprising:

a channel estimation unit for receiving a primary common pilot channel and a secondary common pilot channel, both of which are channel-despread, and for estimating downlink channel status based on the common pilot channels; and a weight calculation unit having a look-up table, said look-up table having predetermined differential weight vectors with associated indexes and normalized weight vectors with associated indexes, for obtaining indexes of differential weight vectors that maximize received antenna signal strength using an estimated channel status, the normalized weight vectors, and the differential weight vectors of the look-up table for a predetermined period, and for calculating new normalized weight vectors by means of the differential weight vectors and a predetermined value to thereby update the previous normalized weight vectors.

10. The apparatus of claim 9, wherein the weight calculation unit comprises:

a channel estimation information storage unit for storing channel status information;

a fixed weight vector calculator having fixed weight vector indexes, for calculating fixed weight vectors based on the channel status information at the predetermined intervals, and for searching for the index of the calculated fixed weight vectors;

an adaptive differential weight vector selector having previous normalized weight vectors and the look-up table, for selecting an index of differential weight vectors that maximize the received antenna signal strength using the channel status information, the previous normalized weight vectors, and the differential weight vectors in the look-up table, for outputting the selected index of differential weight vectors, for updating new weight vectors by means of the differential weight vectors and a predetermined value, for receiving fixed weights at predetermined intervals, and for setting the normalized weight vectors to initial values; and a switch unit for switching to the adaptive differential weight vector selector for a predetermined period in order to transmit feedback information received from the adaptive differential weight vector selector to a base station, for switching to the fixed weight calculator at the end of each predetermined period in order to output fixed weight vectors to the adaptive differential weight vector selector, and for transmitting an index of the fixed weight vectors to the base station.

11. The apparatus of claim 10, wherein the adaptive differential weight vector selector comprises:

a storage unit for storing the previous normalized weight vectors for the predetermined period and for setting the previous normalized weight vectors to initial values by means of the fixed weight vectors at the end of each predetermined period;

a look-up table storage for storing the look-up table with predetermined differential weight vectors with associated indexes;

a weight calculator for calculating the differential weight vectors that maximize the received antenna signal strength using the channel status information, the previous normalized weight vectors, and the differential weight vectors for the predetermined period, and for calculating current normalized weight vectors by means of the differential weight vectors, the channel estimation information, and the predetermined value; and an index extractor for reading an index associated with the differential weight vectors from the look-up table storage.

12. The apparatus of claim 11, wherein the predetermined value is set to a value α that enables optimum normalized weight vectors to be achieved.

13. The apparatus of claim 9, wherein differential weight vectors predetermined between the terminal and the base station in the look-up table are used at an initialization state.

14. The apparatus of claim 10, wherein the switch unit comprises:

a first switch for transmitting an index received from the adaptive differential weight vector selector to the base station during the predetermined period and for transmitting an index received from the fixed weight vector calculator to the base station at the end of each predetermined period; and a second switch for being off during the predetermined period and for outputting the fixed weight vectors to the adaptive differential weight vector selector at the end of each predetermined period.

15. The apparatus of claim 11, wherein the differential weight vectors that maximize the strength of input signals are calculated by $$d^* = \arg\max \frac{\varepsilon^H H^H H \varepsilon}{\|\varepsilon\|^2} d \in D$$

wherein H is an estimation matrix; $H^H$ is a conjugate transpose matrix for H; $\varepsilon$ is a normalized estimation weight vector; and $\varepsilon^H$ is a conjugate transpose matrix for $\varepsilon$.

16. The apparatus of claim 11, wherein differential weight vectors with a predetermined length in the look-up table exist within an multi-dimensional complex vector space of a convex cone.

17. The apparatus of claim 16, wherein any linear combination of differential weight vectors in the look-up table form the L-dimensional complex vector space, where L is the number of base station antennas.

18. The apparatus of claim 16, wherein a size of the look-up table is calculated by $$D_{all} = \left\{ \frac{1}{\sqrt{2}} [(\pm 1 \pm j)_1 \ldots (\pm 1 \pm j)_L]^T \right\}.$$

19. The apparatus of claim 9, wherein the weight calculation unit sets the normalized weight vectors to initial values by means of the fixed weight vectors at the end of each predetermined period.

20. A transmit antenna diversity apparatus in a base station for generating weight vectors for the transmission power of each antenna of at least two antennas at the base station in a mobile communication system, comprising:

a first switch unit for switching feedback information received at predetermined intervals;

a fixed weight vector selector having fixed weight vector indexes, for receiving the feedback information from the first switch unit at the end of a predetermined period, and for outputting fixed weight vectors corresponding to an index in the received feedback information;

an adaptive differential weight generator having previous normalized weight vectors and a look-up table, for receiving the feedback information from the first switch unit at predetermined intervals during a predetermined period, for detecting an index from the feedback information, for reading differential weight vectors corresponding to the index from the look-up table, for calculating normalized weight vectors, and for assigning corresponding weights to the at least two antennas; and a second switch unit for switching to the adaptive differential weight vector generator during the predetermined period in order to assign normalized weight vectors received from the adaptive differential weight vector generator to the antennas, for switching to the fixed weight vector selector at the end of each predetermined period in order to assign fixed weight vectors to the antennas, and for outputting the fixed weights vector to the adaptive differential weight vector generator.

21. The apparatus of claim 20, wherein the adaptive weight vector generator comprises:

a weight storage for storing the normalized weight vectors during the predetermined period, and for setting the previous normalized weight vectors to initial values by means of the fixed weight vectors at the end of each predetermined period;

a look-up table storage for storing the look-up table with predetermined differential weight vectors with associated indexes; and a weight calculator for detecting an index from the feedback information at predetermined intervals during the predetermined period, for reading the differential weight vectors corresponding to the detected index from the look-up table, for calculating the normalized weight vectors using the differential weight vectors, the previous normalized weight vectors, and a predetermined value, and for updating the previous normalized weight vectors to the calculated normalized weight vectors.

22. The apparatus of claim 21, wherein the switch unit comprises:
- a first switch for switching a weight vector received from the adaptive differential weight vector generator to each antenna during the predetermined period and for switching a weight vector received from the fixed weight vector selector to each antenna at the end of each predetermined period; and
- a second switch for being off during the predetermined period and for outputting a fixed weight vector to the adaptive differential weight vector generator at the predetermined intervals during the predetermined period.

23. The apparatus of claim 21, wherein the predetermined value is a value α that enables optimum normalized weight vectors to be achieved.

24. A method in a mobile terminal of generating weight vectors for the transmission power of each antenna of at least two antennas at a base station using transmit antenna diversity, said mobile terminal having a look-up table and previous normalized weight vectors, in a mobile communication system comprising the steps of:
- receiving a primary common pilot channel and a secondary common pilot channel, both of which are channel-despread;
- estimating downlink channel status based on the received common pilot channels;
- searching for an index corresponding to differential weight vectors that maximize the strength of received signals using the estimated channel status, the normalized weight vectors, and differential weight vectors of the look-up table during a predetermined period;
- transmitting the index found by the searching to a base station; and
- calculating new normalized weight vectors by means of the corresponding differential weight vectors and a predetermined value to thereby update the previous normalized weight vectors.

25. The method of claim 24, wherein the index searching step comprises the steps of:
- searching for the differential weight vectors that maximize the strength of received signals using the channel status information, the previous normalized weight vectors, and the differential weight vectors of the look-up table; and
- searching for the index from the look-up table of the differential weight vectors found in the searching step.

26. The method of claim 24, wherein the predetermined value is set to a value α that enables optimum normalized weight vectors to be achieved.

27. The method of claim 24, further comprising the step of:
- setting the normalized weight vectors to initial values by calculating fixed weight vectors at the end of each predetermined period, after the normalized weight vectors updating step.

28. A method in a base station using transmit antenna diversity of generating weight vectors for the transmission power of each of at least two antennas at the base station, said base station having a look-up table and previous normalized weight vectors, in a mobile communication system, comprising the steps of:
- receiving feedback information from a mobile terminal;
- receiving a differential weight vector index corresponding to adaptive differential weight vectors during a predetermined period;
- searching for differential weight vectors corresponding to the received differential weight vector index from the look-up table;
- calculating normalized weight vectors using differential weight vectors found in the searching step;
- assigning the normalized weight vectors to the antennas;
- updating previous normalized weight vectors with the calculated normalized weight vectors;
- receiving a fixed weight vector index corresponding to a fixed weight vectors at the end of the predetermined period; and
- assigning fixed weight vectors corresponding to the received fixed weight vector index to the antennas.

* * * * *